US005771251A

United States Patent [19]

Kringlebotn et al.

[11] Patent Number: 5,771,251
[45] Date of Patent: Jun. 23, 1998

[54] OPTICAL FIBRE DISTRIBUTED FEEDBACK LASER

[75] Inventors: Jon Thomas Kringlebotn, Trondheim, Norway; David Neil Payne, Hamble; Laurence Reekie, Bitterne Park, both of United Kingdom; Jean Luc Archambault, Victoria, Canada

[73] Assignee: University of Southampton, Southampton, United Kingdom

[21] Appl. No.: 737,181

[22] PCT Filed: May 5, 1995

[86] PCT No.: PCT/GB95/01026

§ 371 Date: Mar. 20, 1997

§ 102(e) Date: Mar. 20, 1997

[87] PCT Pub. No.: WO95/31020

PCT Pub. Date: Nov. 16, 1995

[30] Foreign Application Priority Data

May 6, 1994 [GB] United Kingdom .................. 9409033

[51] Int. Cl.[6] ................................ H01S 3/30; G02B 6/34
[52] U.S. Cl. .................................. 372/6; 372/96; 372/98; 385/37; 385/123; 385/141
[58] Field of Search ................. 372/6, 9, 21, 96, 372/98; 385/10, 37, 123, 141; 359/333, 341, 343

[56] References Cited

U.S. PATENT DOCUMENTS

| | | | |
|---|---|---|---|
| 3,958,188 | 5/1976 | Fletcher et al. ............... | 372/6 X |
| 5,140,456 | 8/1992 | Huber ............................. | 372/6 X |
| 5,166,940 | 11/1992 | Tumminelli et al. ............ | 372/6 |
| 5,187,760 | 2/1993 | Huber ............................. | 385/37 |
| 5,237,576 | 8/1993 | DiGiovanni et al. ............ | 372/6 |
| 5,305,335 | 4/1994 | Ball et al. ....................... | 372/6 |
| 5,511,083 | 4/1996 | D'Amato et al. ............... | 372/6 |
| 5,564,832 | 10/1996 | Ball et al. ....................... | 372/6 X |

OTHER PUBLICATIONS

Archambault J.L., et al., Photosensitivity & Self-Organization in Optical Fibers & Waveguides, Aug., 1993, Canada, vol. 2044.

Kujawski A., et al., Optical Engineering, 'Optimization of output power in lasers' Mar., 1992, USA, vol. 31., No. 3.

Szczepanski, P., et al., IEEE Journal of Quantum Electronics, 'Nonlinear operation of a planar . . . ' May 1989, USA, vol. 25, No. 5, pt.1.

Kringlebotn, J.T. et al., IEEE Photonics Technology Letters, 'Efficient diode-pumped single-freq. . . . ' Oct. 1993,USA, vol. 5, No. 10.

Rabinovich, W.S., et al., IEEE Journal of Quantum Electronics, 'Above-threshold mode . . . ' Aug. 1989, USA, vol. 25 No. 8.

Reid, D.C.J., et al., Eletronic Letters, 'Phase-shifted Moire grating fibre resonators' Jan. 1990, UK, vol. 26, No. 1.

Kitagawa, T., et al., Electronics Letters, 'Amplification in erbium-doped silica-based planar lightwave circuits', Sep. 1992, UK, vol. 28, No. 19.

Kringlebotn, J.T., et al., Optics letters, 'Er/sup 3+/:yb/sup3+/-codoped fiber distributed-feedback laser', Dec. 1994, USA, vol. 19, No. 24.

*Primary Examiner*—Brian Healy
*Attorney, Agent, or Firm*—Renner, Otto, Boisselle & Sklar, P.L.L.

[57] ABSTRACT

An optical fibre distributed feedback laser comprises an amplifying optical fibre (50) operable to provide optical gain at a lasing wavelength, in which a diffraction grating (30) is disposed on at least a portion of the amplifying optical fibre to provide distributed optical feedback for sustaining lasing action at the lasing wavelength.

16 Claims, 7 Drawing Sheets

OPTICAL FIBRE DISTRIBUTED FEEDBACK LASER

TECHNICAL FIELD OF THE INVENTION

This invention relates to optical fibre lasers.

BACKGROUND OF THE INVENTION

Many light sources for optical fibre communications are electrically pumped Fabry-Perot (F-P) type semiconductor lasers, where the optical feedback is provided by reflections from the laser cavity end-surfaces (mirrors).

A lasing mode in a F-P type laser has to meet two conditions:

1) the cavity gain must be equal to the cavity losses, and
2) the cavity round trip phase shift must be equal to a multiple of $2\pi$.

The threshold gain is the same for all modes satisfying the phase condition. Since the gain difference between the adjacent longitudinal modes is generally relatively small and there are many modes which satisfy the phase condition, these lasers may exhibit multi-mode operation.

In applications such as high speed optical communication where dynamic single-mode operation under modulation is required, it is common to use semiconductor distributed Bragg reflector (DBR) lasers.

A DBR laser is a F-P-type laser where the end-reflectors are Bragg gratings which have a wavelength dependent reflection owing to their periodic spatial variation of the refractive index.

The reflection from a Bragg grating is strongest at the Bragg wavelength $\lambda_B$ which fits the grating period $\Lambda$ ($\lambda_B = 2n\Lambda$, where n is the average refractive index of the medium). The lasing conditions for a DBR laser are the same as for a F-P laser with mirrors, but since the gratings only reflect within a narrow spectral band around the Bragg wavelength the mode closest to the Bragg wavelength will experience stronger feedback than the other longitudinal modes. If the difference in reflectivity (feedback) between adjacent longitudinal modes is sufficiently large, only a single longitudinal mode will tend to oscillate under modulation conditions.

Semiconductor distributed feedback lasers have been proposed. In these devices a grating extends across the lasing region and causes distributed feedback of the laser radiation.

DBR lasers in which the gratings and the gain medium are formed from optical fibre have been reported. These devices have the advantage that they are compatible with optical fibre communication links, they are simple in construction, and can offer low intensity noise and narrow linewidths.

However, in order to achieve single frequency operation from a DBR fibre laser, two apparently conflicting requirements must be addressed.

Firstly, the length of the fibre cavity (the fibre between the two end-reflectors) must be made as short as possible. The reason for this is that the spectral spacing between resonant cavity modes increases with a decreasing cavity length. When the resonant cavity modes are more widely separated, the differences in the round-trip cavity loss between adjacent modes caused by the wavelength dependent reflection of the gratings are more exaggerated, so it is more likely that a single oscillation mode will dominate.

However, a second requirement results from the fact that fibre lasers are longitudinally pumped optically, in contrast to the electrical pumping of semiconductor lasers. This feature means that the fibre cavity should be made long enough to allow sufficient energy at the pump wavelength to be absorbed.

The first requirement listed above leads to a desired cavity length of about a few centimetres or less. However, in erbium ($Er^{3+}$) doped fibres commonly used as the gain medium, the pump absorption in such short laser lengths is normally only a few percent, and hence the so-called slope efficiency of these lasers is very low (less than 1%) even with high $Er^{3+}$-concentration. If the pump absorption is increased by doping the fibre more heavily, so-called concentration quenching occurs leading to a loss of slope efficiency and the lasers are also then prone to strong self-pulsation. Although a "MOPA" (Master Oscillator Power Amplifier) configuration has been proposed, where the residual pump power is used to pump a fibre amplifier, the output from a MOPA is more noisy than the direct output from a laser, and it usually requires an optical isolator between the laser and the amplifier to eliminate coupling between the laser and the amplifier and to improve the noise.

U.S. Pat. No. 3,958,188 discloses a side-pumped DFB laser making use of a grating formed by micromachining grooves into an optical fibre. The article, "Photosensitivity and self-organisation in optical fibres and waveguides", proc SPIE, vol 2044 pp 69–75 discloses an ultraviolet side-pumped transient fibre DFB laser with pulsed operation. IEEE Journal of Quantum Electronics, 25 (1989) 5, pp 871–877 and Optical Engineering, 31(1992) 3, pp 440–446 disclose Nd:YAG crystal fibre DFB lasers.

SUMMARY OF THE INVENTION

This invention provides an optical fibre distributed feedback laser comprising an amplifying optical fibre doped with erbium and ytterbium and operable to provide optical gain at a lasing wavelength, in which a diffraction grating is disposed on at least a portion of the amplifying optical fibre to provide distributed optical feedback for sustaining lasing action within the portion at the lasing wavelength.

In a DFB (distributed feedback) fibre laser according to the invention, the optical feedback required for the laser operation is provided by a periodic spatial variation of the refractive index of the actual gain medium or of other fibre properties such that an optical wave travelling in the forward direction is successively reflected by the grating into a wave travelling in the backward direction and vice versa. In other words, the gain medium and the feedback grating are co-located.

Fibre DFB lasers will have the same advantages over semiconductor lasers as the fibre DBR lasers described above, but will also tend to have a better single-frequency stability than the fibre DBR lasers. This feature arises because the laser wavelength of a fibre DFB laser can be uniquely determined by the Bragg wavelength of one single grating. Also, single mode operation is promoted because the threshold gain increases with wavelength away from the Bragg wavelength. In contrast, in a fibre DBR laser, which is an F-P-type laser, the laser wavelength is the wavelength with lowest round trip loss. This normally corresponds to the longitudinal mode closest to (but in general different from) the Bragg wavelength. In other words, the requirement for short length in order to achieve mode stability is relaxed.

In addition, since the lowest loss mode in an F-P type laser depends on the product of the reflection spectra of the two gratings, an accurate determination of the laser wavelength this requires matching of the Bragg wavelengths of two gratings, either through the writing of the gratings, or after the writing through tuning of one of the gratings (either by heating/cooling or by stretching the grating). A fibre DFB laser can operate at a wavelength defined by only one grating.

Accordingly, a laser according to the invention can avoid the problems described above by allowing robust single mode operation without necessarily compromising the laser power output or noise performance.

The amplifying optical fibre is doped with rare earth dopants. In particular, the amplifying optical fibre is doped with erbium, and, as co-dopant to increase the absorption of the pump wavelength, with ytterbium ($Yb^{3+}$).

Preferably the amplifying optical fibre is optically pumped. In this case it is preferred that the laser comprises means for generating optical pump radiation to pump the amplifying optical fibre.

A part of the amplifying fibre can advantageously be used to amplify the laser output, being pumped by residual optical pumping radiation emerging from the laser.

In one preferred embodiment the laser comprises a mirror disposed at one end of the diffraction grating for reflecting at least a part of optical radiation propagating along the diffraction grating. The mirror can introduce a phase shift to promote the propagation within the laser of radiation at a single mode either side of the Bragg wavelength of the diffraction grating.

Preferably, the longitudinal separation between the mirror and the diffraction grating is less than 1 micrometre (about half a wavelength in the fibre medium). It is preferred that this separation can be adjusted by suitable adjustment means.

As an alternative approach, it is preferred that the grating itself comprises at least one phase irregularity. This can promote the propagation of radiation at the Bragg wavelength.

The phase irregularity could be a discontinuity or a substantially continuous phase variation along the grating.

One preferred way of generating a grating with a phase irregularity is the so-called "Moire" method, in which the grating is fabricated by generating an interference pattern between two superposed diffraction gratings. The use of this method to form gratings having a phase irregularity, and the potential use of such gratings in semiconductor DFB lasers, is described in the paper "Phase Shifted Moire Grating Fibre Resonators", Electronics Letters, Vol 26, No 1, pp 10–11 (1990).

Although the phase irregularity could be permanently fabricated into the grating, the phase irregularity could instead be generated only during operation or in fabrication, for example by heating a portion of the grating during operation.

Viewed from a second aspect, this invention provides a method of fabricating an optical fibre distributed feedback laser, the method comprising the step of fabricating a diffraction grating on at least a portion of an amplifying optical fibre doped with erbium and ytterbium and operable to provide optical gain at a lasing wavelength, the diffraction grating providing distributed optical feedback for sustaining lasing action within the portion at the lasing wavelength.

BRIEF DESCRIPTION OF THE DRAWINGS

The invention will now be described by way of example with reference to the accompanying drawings, throughout which like parts are referred to by like references, and in which.

DETAILED DESCRIPTION

Figure 1:
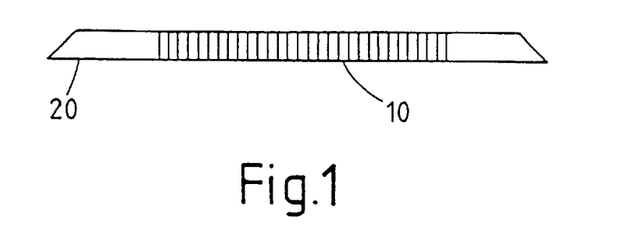
FIG. 1 is a schematic diagram of a doped optical fibre DFB laser employing a uniform grating with no end-reflectors.
Figure 2:
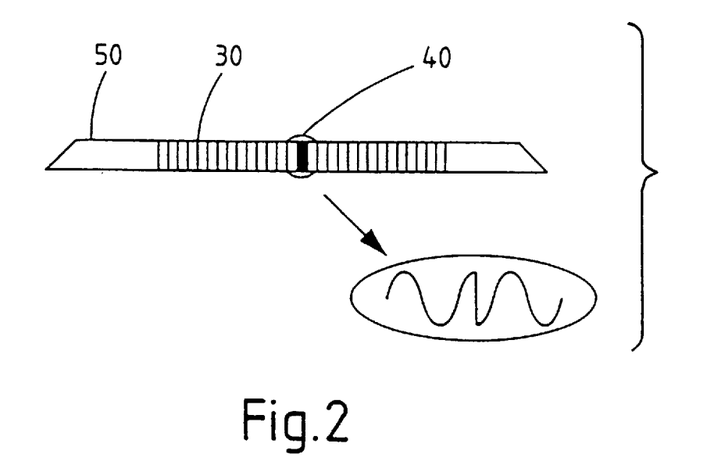
FIG. 2 is a schematic diagram of a doped optical fibre DFB laser employing a phase-shifted grating with no end-reflectors.
Figure 3:
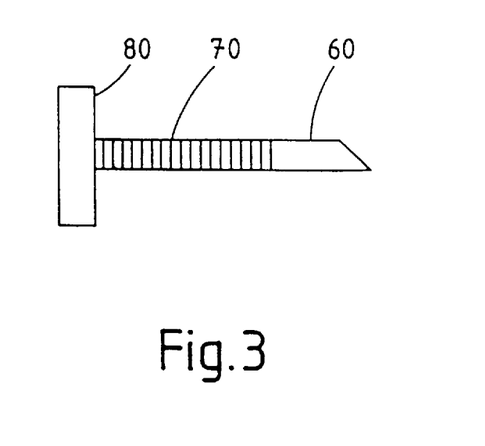
FIG. 3 is a schematic diagram of a doped optical fibre DFB laser employing a uniform grating with one end-reflector.

FIGS. 1, 2 and 3 are schematic diagrams of doped optical fibre DFB lasers. In particular, FIG. 1 illustrates a laser employing a uniform grating with no end-reflectors; FIG. 2 illustrates a laser employing a phase-shifted grating with no end-reflectors; and FIG. 3 illustrates a laser employing a uniform grating with one end-reflector (e.g. a dichroic end reflector).

The DFB lasers shown in FIGS. 1 to 3 comprise optical fibres containing one or more rare-earths, in which the feedback (a Bragg grating) and the gain (the doped fibre) are substantially co-located. In particular, in FIG. 1 a uniform grating 10 is imposed on a doped optical fibre 20; in FIG. 2 a grating 30 having a phase discontinuity 40 is imposed on a doped optical fibre 50; and in FIG. 3 a doped optical fibre 60 having a uniform grating 70 is disposed adjacent to a reflector 80.

The lasers of FIGS. 1 to 3 are optically end-pumped (e.g. by a semiconductor pump laser).

In a DFB fibre laser such as the lasers illustrated in FIGS. 1 to 3, the optical feedback required for the laser operation is provided by a periodic spatial variation of the refractive index of the gain medium or of other fibre properties such that an optical wave travelling in the forward direction is successively reflected by the grating into a wave travelling in the backward direction and vice versa.

The strength of the feedback is normally given in terms of the product $\kappa L$, where $\kappa = \pi \Delta n / \lambda_B$ is the coupling coefficient and L is the length of the grating. $\kappa n$ is the refractive index modulation. The reflectivity at the Bragg wavelength is given as $\tanh^2(\kappa L)$. The width of the grating stop band is proportional to $\kappa$. The higher $\kappa$ is, the bigger is the frequency separation between the resonant modes of the DFB structure.

While for a F-P-type laser the threshold gain is the same for all the longitudinal modes, the DFB laser threshold gain increases the further away the resonant modes are from the Bragg wavelength. However, with a uniform grating along the whole cavity length and no end-reflectors (i.e. the laser of FIG. 1) no real mode can exist in the centre of the stop-band, ie. at the Bragg wavelength. At this wavelength the round trip gain has a real value, but with a negative sign. In such a device two modes of equal threshold occur symmetrically on each side of the stop-band, where the phase condition can be satisfied. Accordingly a uniform DFB laser of the type shown in FIG. 1 will oscillate at two different frequencies separated by the width of the stop-band (which is proportional to $\kappa$).

FIGS. 2 and 3 illustrate two possible ways of obtaining single-frequency operation of a DFB laser. In FIG. 2 a single-pass phase shift (or irregularity) of $\pi$ is introduced in the grating. This corresponds to a $\pi/2$ optical phase shift so that the round trip phase condition is satisfied at the Bragg wavelength.

The phase shift can be introduced into the grating either through a phase shift in the grating itself or through a phase-adjustment region. In a phase shifted DFB laser the field of the mode decays exponentially as an evanescent field from the phase shift region into the DFB structures on the two sides and is coupled out. A phase shifted DFB laser also has the lowest possible laser threshold gain since the feedback is strongest at the Bragg wavelength, and so is suitable for single mode operation. The threshold discrimination and frequency separation between the fundamental mode and the first higher order modes is greater than that of the uniform DFB laser of FIG. 1, and much greater than F-P-type lasers, including DBR lasers.

An alternative arrangement is shown in FIG. 3 in which an end-reflector is used to change the round trip phase shift in the laser. With one end-reflector one of the two modes will be enhanced, while the other will be suppressed, depending on the phase of the mirror relative to the grating. The end-reflector will effectively increase the grating length and reduce the threshold gain. Also the threshold will depend on the mirror phase. It is therefore preferred that the solution of FIG. 2 is adopted.

Fibre DFB lasers will have the same advantages over semiconductor DBR/DFB lasers as the fibre DBR lasers described above, but will also tend to have a better single-frequency stability than the fibre DBR lasers. This feature arises because the laser wavelength of a phase-shifted fibre DFB laser is uniquely determined by the Bragg wavelength of one single grating, while in a fibre DBR laser, which is an F-P-type laser, the laser wavelength is the wavelength with lowest round trip loss. This normally corresponds to the longitudinal mode closest to (but in general different from) the Bragg wavelength. However, since the lowest loss mode in an F-P laser depends on the product of the reflection spectra of the two gratings, an accurate determination of the laser wavelength requires matching of the Bragg wavelengths of two gratings, either through the writing of the gratings, or after the writing through tuning of one of the gratings (either by heating/cooling or by stretching the grating). With one mirror and one grating end-reflector matching is not a problem, but this type of F-P laser is no longer a true all-fibre laser.

The gratings 10, 30 and 40 can be fabricated as intra-core gratings or gratings at the core/cladding boundary.

Intra-core fibre Bragg gratings can be produced non-invasively in germanosilicate-based and other photosensitive fibres. In germanosilicate fibres the gratings can be written holographically through the cladding using a coherent UV (ultraviolet) two-beam interference pattern with a wavelength selected to lie in the oxygen-vacancy defect band of germania, near 244 nm (nanometres). The Bragg wavelength of the grating can easily be adjusted by changing the angle between the two interfering beams.

Fibre gratings can also be written by the use of a silica phase mask illuminated by a single UV laser beam, as described in the paper "Phase-mask method for volume manufacturing of fibre phase gratings", Conference on Optical Fibre Communications, 1993, post deadline paper PD16.

Figure 4:
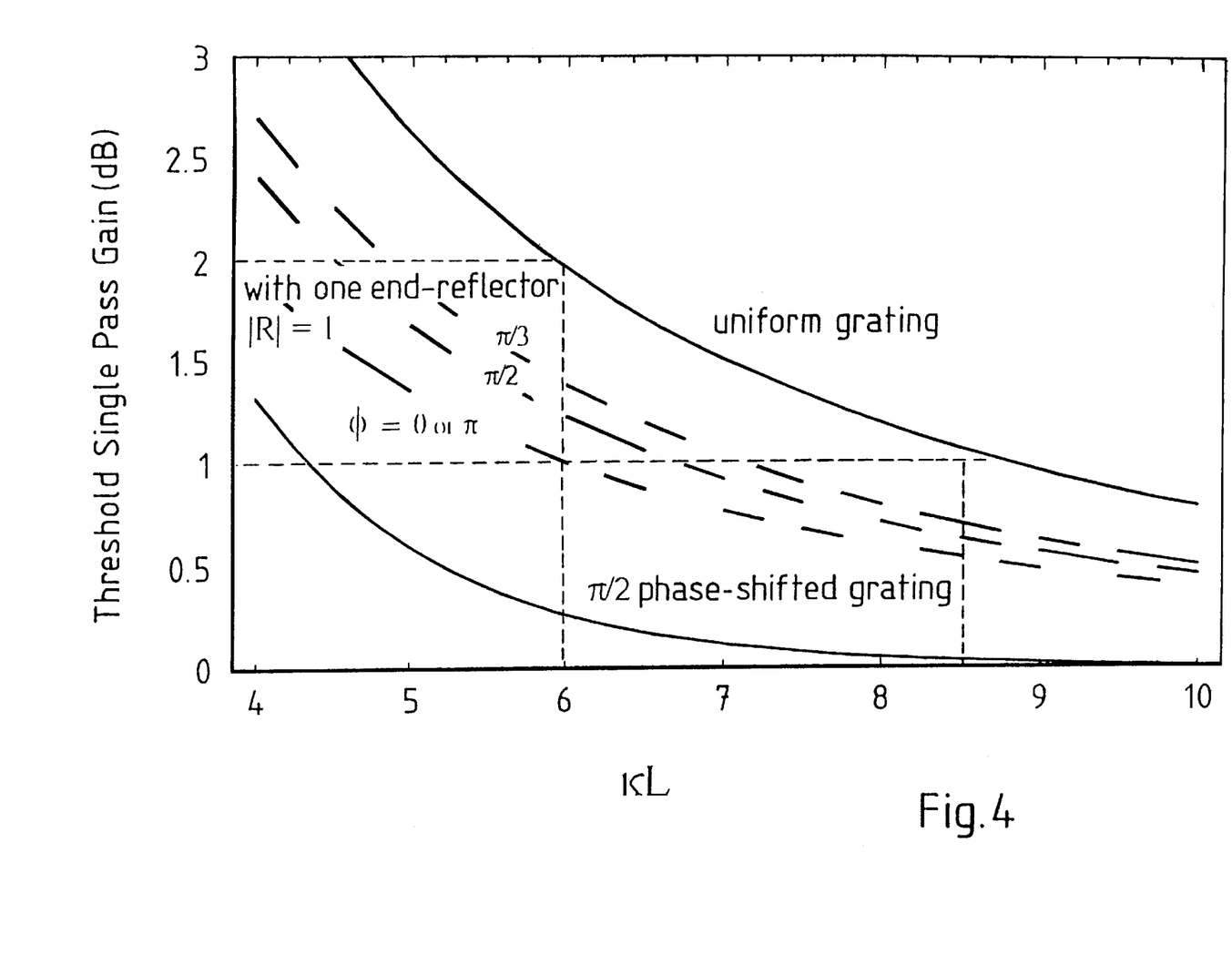
FIG. 4 is a graph illustrating the theoretical laser threshold gain of fundamental mode of a DFB laser as a function of grating strength with (i) a uniform grating, (ii) a uniform grating with one substantially 100% end-reflector, and (iii) a $\pi/2$ phase shifted grating.

FIG. 4 is a graph illustrating the theoretical laser threshold gain of the fundamental mode of a DFB laser as a function of grating strength $\kappa L$ with (i) a uniform grating, (ii) a uniform grating with one substantially 100% end-reflector, and (iii) a $\pi/2$ phase shifted grating. FIG. 4 shows that a phase-shifted grating DFB laser has a significantly lower threshold gain than uniform grating DFB lasers (with or without end-reflector). In the case of a uniform grating DFB laser with one end-reflector the threshold gain is significantly lower than without any end-reflectors, but it depends on the phase relationship between the reflector and the grating.

A phase-shifted fibre DFB laser can be robustly single mode for much longer cavity lengths than a fibre DBR laser (because of the differential threshold gain between the fundamental mode at the Bragg wavelength and higher order modes) provided that one can write sufficiently long fibre gratings.

Two specific prototype examples of DFB optical fibre lasers will now be described with reference to FIGS. 5 to 12. These are (a) a uniform grating fibre DFB laser with one end-reflector with substantially 100% reflectivity at the lasing wavelength (FIG. 5); and (b) a phase-shifted grating fibre DFB laser with no end-reflectors (FIG. 6).

Figure 5:
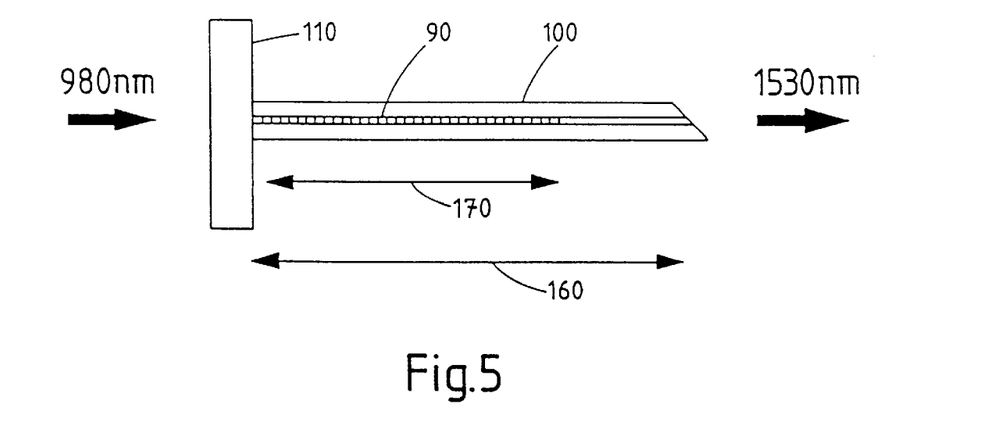
FIG. 5 is a schematic diagram of an $Er^{3+}:Yb^{3+}$ doped fibre DFB laser employing a uniform grating with a substantially 100% end-reflector.

FIG. 5 is a schematic diagram of an $Er^{3+}:Yb^{3+}$ doped fibre DFB laser employing a uniform grating 90 written into an $Er^{3+}:Yb^{3+}$ doped fibre 100 with an end-reflector 110 (e.g. a dichroic reflector) having a reflectivity of substantially 100% at the lasing wavelength.

Figure 6:
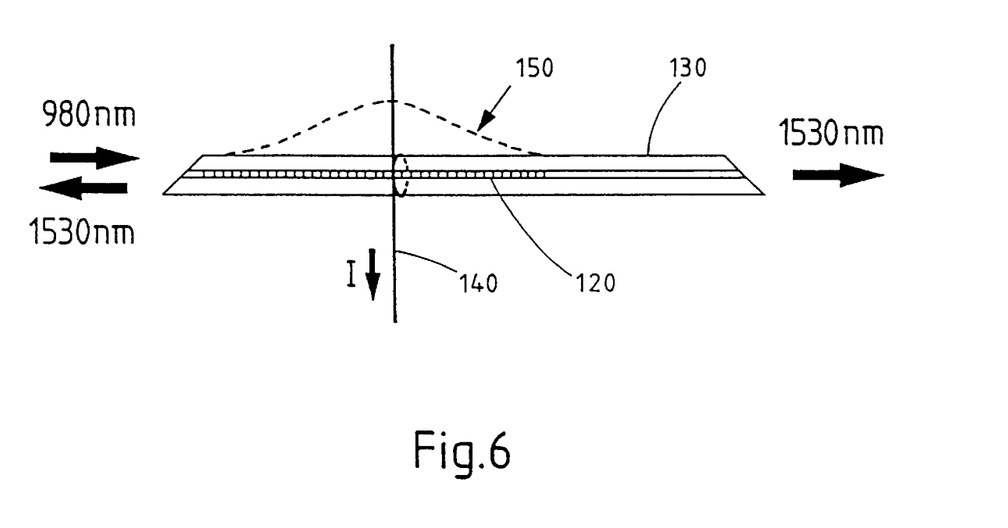
FIG. 6 is a schematic diagram of an $Er^{3+}:Yb^{3+}$ doped fibre DFB laser employing a (temperature) phase-shifted grating.

Similarly, FIG. 6 is a schematic diagram of an $Er^{3+}:Yb^{3+}$ doped fibre DFB laser in which a uniform grating 120 is written into an $Er^{3+}:Yb^{3+}$ doped optical fibre 130. In this case, a temporary phase irregularity is introduced into the grating in operation by heating a small region of the grating by passing current through an electrical resistance wire 140 wound around the fibre. This generates a temperature gradient 150 along the fibre, altering the phase of the grating impressed on the fibre. This arrangement will be referred to as a (temperature) phase-shifted grating.

The fibres are doped with both $Er^{3+}$ and $Yb^{3+}$, the latter having the effect of increasing the absorption at the pump wavelength by more than two orders of magnitude. The 980 nm pump excites the $Yb^{3+}$ ions, and energy is efficiently transferred to the $Er^{3+}$ ions by resonant coupling.

In each of the two cases the grating was a 2 cm (centimetres) long uniform fibre Bragg grating with a refractive index modulation of about $2.1*10^{-4}$ ($\kappa L=8.5$) written in an alumino-phosphosilicate $Er^{3+}:Yb^{3+}$-doped fibre. The $Er^{3+}:Yb^{3+}$-doped fibre was made photosensitive using the so-called "hydrogen loading" technique, described in the article, "High pressure $H_2$ loading as a technique for achieving ultrahigh UV photosensitivity and thermal sensitivity in $GeO_2$ doped optical fibres," Electronics Letters, vol. 29, pp. 1191–1193, 1993. The fibre was soaked in 140 atmospheres of $H_2$ at 80 degrees Celsius over 15 hours. The grating was then written with a Krypton-fluoride (KrF) excimer laser at 248 nm using a side-writing technique described in the article "Formation of Bragg gratings in optical fibres by a transverse holographic method," Optics Letters, vol. 14, pp. 823–825, 1989. The laser was fired at 20 Hz with a pulse fluence of about 0.5 $J/cm^2$, exposing the 20 mm fibre section for over 3 hours.

The phosphorus oxide ($P_2O_5$) and aluminium oxide ($Al_2O_3$) concentrations in the $Er^{3+}$:$Yb^{3+}$-doped fibre are 18 and 2 wt % (percentage by weight) respectively. The $Er^{3+}$ concentration is approximately 1000 ppm (parts per million) (0.26 wt %). The fibre has an $Yb^{3+}$:$Er^{3+}$ concentration ratio of 12.5:1, a Numerical Aperture of 0.2 and a second mode cut-off wavelength of 1130 nm. The diameter of the fibre was 125 μm. The peak absorption at 1535 nm (which was also the fibre grating Bragg wavelength) was 0.5 dB/cm. This is approximately the maximum available gain (with complete population inversion). Hence, with a 2 cm long DFB structure the maximum available single pass gain is 1 dB.

Referring to FIG. 5, the total length 160 of the $Er^{3+}$:$Yb^{3+}$-doped fibre was 3 cm, and the length 170 of the grating at the reflector end was 2 cm. The fibre was embedded in a glass capillary with a diameter of 3 mm. An output end was angle-polished to avoid reflections.

The laser was pumped by a 100 mW 980 nm diode laser through the reflector which transmitted about 97% of light at the pump wavelength.

Figure 7:
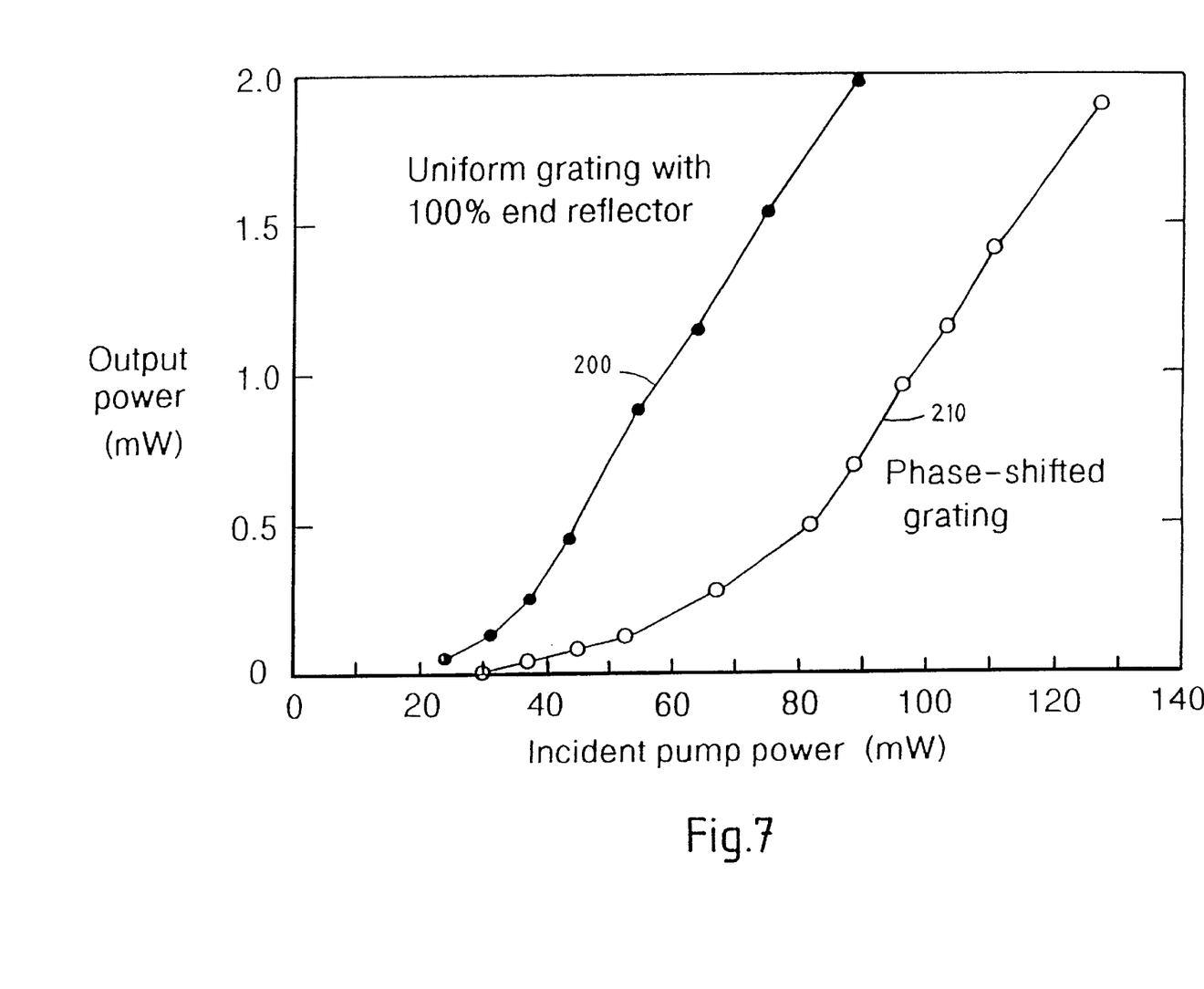
FIG. 7 is a graph illustrating empirical laser characteristics for a DFB fibre laser employing (i) a uniform grating with substantially 100% end-reflector, and (ii) a (temperature) phaseshifted grating.

The laser characteristics of the uniform grating DFB laser with an end-reflector having a substantially 100% transmission at the pump wavelength is shown as a curve 200 in the graph of FIG. 7. The laser had a threshold incident pump power of about 15 mW and an output power of about 2 mW for 90 mW incident pump power. The output power varied with changing lateral position of the mirror relative to the fibre grating, which will change the mirror reflectivity (both phase and amplitude) and the launching conditions. The slope efficiency was about 5%. Lasing also occurred with an end-reflector with 4% reflectivity, ie. without the mirror. The threshold pump power in this case was 34 mW.

Figure 8:
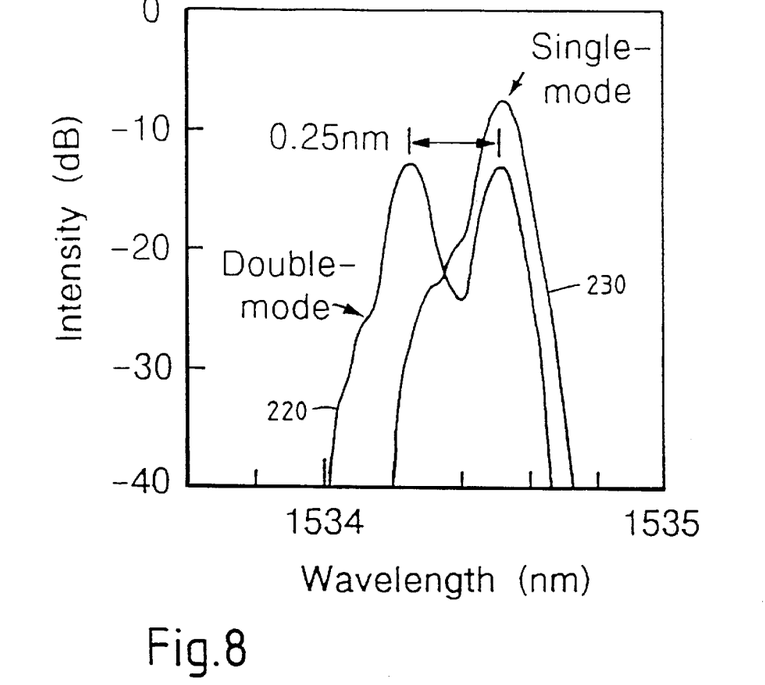
FIG. 8 is a graph illustrating the optical spectrum of a uniform grating fibre DFB laser with a substantially 100% end-reflector in single-mode and double-mode operation.
Figure 9:
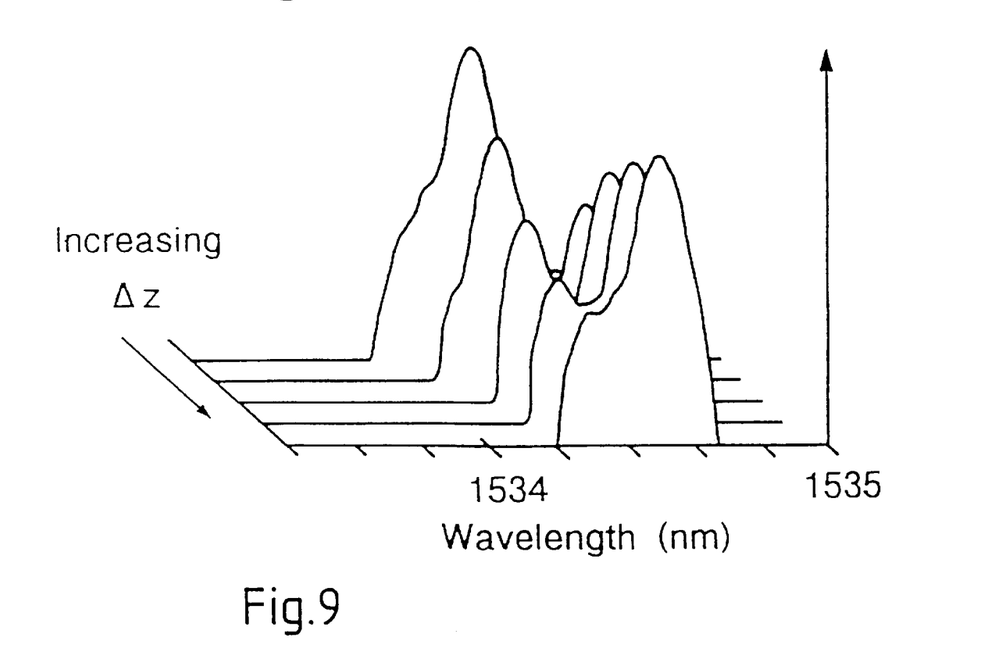
FIG. 9 is a graph illustrating the optical spectrum of a uniform grating fibre DFB laser with a substantially 100% end-reflector against mirror displacement.

The optical spectrum for the laser of FIG. 5 is shown in FIG. 8. The basic spectrum 220 has two peaks as expected for a uniform DFB laser, but the relative power in each of the two modes depends on the mirror phase relative to the fibre grating. The separation between the two modes is about 0.25 nm, as expected from the theory assuming a grating strength of κL=8.5. FIG. 9 shows the laser spectrum for increasing mirror displacement (Δz) and hence changing phase.

Adjustment means (such as a micrometer screw) can be provided to allow the longitudinal mirror-grating separation to be adjusted to improve the laser's performance.

Figure 10:
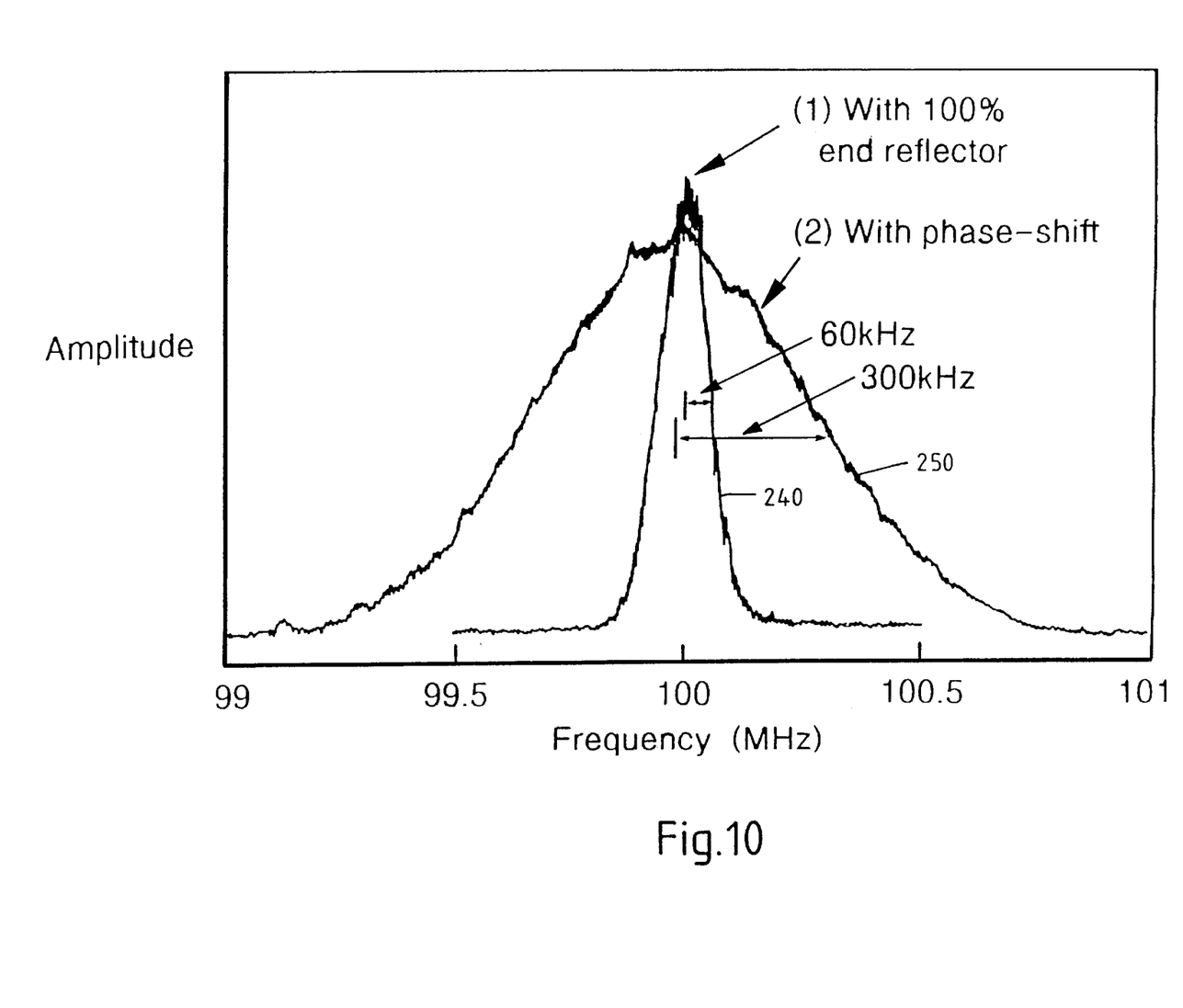
FIG. 10 is a graph illustrating laser linewidth of a single-mode uniform grating fibre DFB laser with a substantially 100% end-reflector and a phase-shifted grating fibre DFB laser.

The optical linewidth when the laser was single-mode was measured with a self-heterodyne delay-line to be about 60 kHz, as shown by a curve 240 in the graph of FIG. 10.

During performance testing of the phase-shifted grating fibre DFB laser as shown in FIG. 6, the prototype laser was the same as the uniform grating fibre DFB laser of FIG. 5, but with the end-reflector removed and replaced with a glass microscope slide with index-matching fluid to remove any reflections (having the same effect as angle-polishing of the end-face).

The phase shift was introduced by having the electrical resistance wire 140 wrapped around the glass capillary, substantially at the centre of the grating. Alternatively the wire could contact the fibre directly. The wire was 2 cm long and 175 μm in diameter, and its resistance was 0.46 Ohm/cm. By running an electric current through the wire the fibre grating was heated more at the centre than at the ends, causing a falling temperature gradient 150 at each side of the wire. The refractive index and hence the Bragg wavelength is dependent on the temperature, and is thus changed more at the centre than the ends of the grating, causing an optical phase-shift for the forward and backward propagating waves in the DFB structure. This caused a gradual phase-shift which can be shown to yield a more uniform intensity distribution along the gain medium than an abrupt phase shift at the centre of the DFB structure. This will give a more uniform gain saturation and better use of the available gain.

With this method the position of the phase-shift can easily be changed by changing the position of the wire. With increasing temperature the output power varied periodically, indicating that the phase-shift also varied periodically (as expected). In the present embodiment the maximum output power occurred with a wire current of 320 mA and voltage of 0.6 V. The output power from one end of the phase shifted fibre DFB with an optimum phase shift is plotted as a curve 210 in FIG. 7.

The pump source was a 150 mw 980 nm diode laser. The threshold incident pump power is about 32 mW, and the slope efficiency is about 5%. The maximum fibre laser output power at the output (angle-polished) end is 1.9 mW with 127 mW incident pump power. The laser output power from the input end was not measured, but would be expected to be similar to that at the output end. The gradually increasing slope at low pump powers is probably due to the 1 cm long piece of $Er^{3+}$:$Yb^{3+}$-doped fibre at the output end which at low pump power acts as an absorber (with maximum 0.5 dB absorption), while at higher pump powers it acts as an amplifier (with maximum 0.5 dB gain). Hence, this laser is an example of a MOPA (Master Oscillator Power Amplifier) configuration.

The laser linewidth in this case was measured to be about 300 kHz, as shown by a curve 250 in FIG. 10. This linewidth was found to be substantially independent of the output power.

Figure 11:
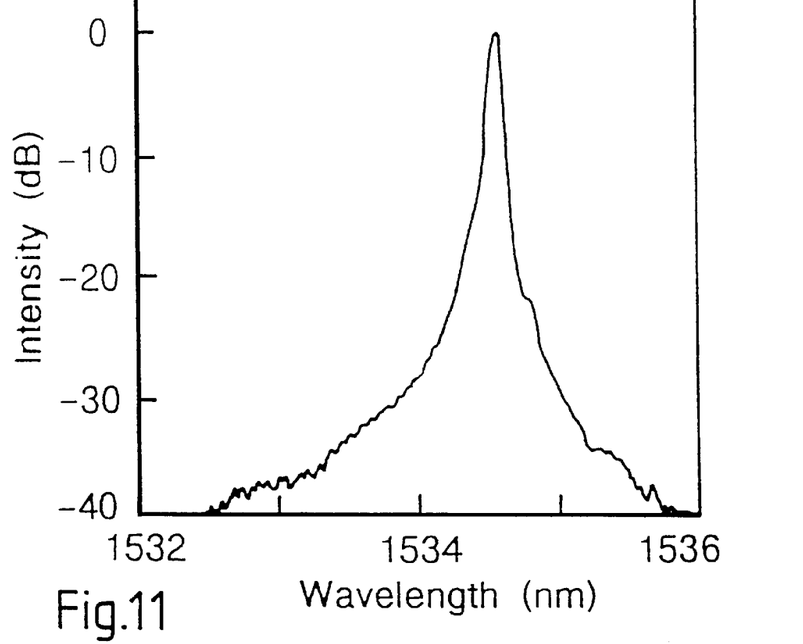
FIG. 11 is a graph illustrating the optical spectrum of a temperature phase-shifted grating fibre DFB laser at maximum power.
Figure 12:
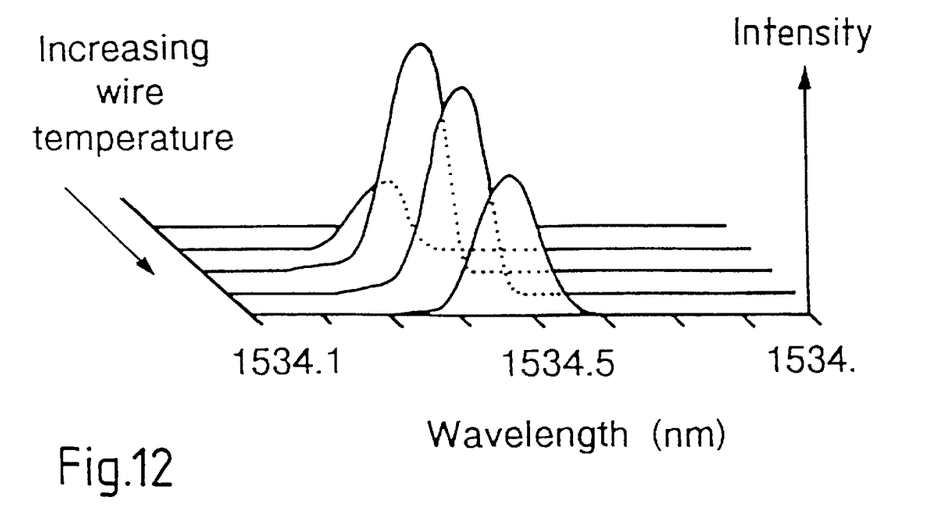
FIG. 12 is a graph illustrating the optical spectrum of a temperature phase-shifted grating fibre DFB laser against wire-temperature.

The optical spectrum of the phase-shifted fibre DFB laser is shown in FIG. 11. The laser is single-mode, with no side-modes. FIG. 12 shows variations in the spectrum with increasing wire temperature. The amplitude increases from zero to a maximum and then decreases again. The wavelength increases with increasing temperature as expected.

There are several other possible ways to induce a phase-shift in the fibre grating, other than the "wire-method" shown in FIG. 6. One possibility is to write two gratings with slightly different Bragg wavelengths on top of each other, to form a so-called Moire grating. This technique is described in the article "Phase Shifted Moire Grating Fibre Resonators", Electronics Letters, Vol 26, No 1, pp 10–11 (1990). The Moire grating normally has a permanent π phase shift which corresponds to an optical phase shift of π/2, but can also be made with smaller phase shifts (using different exposure times for the two gratings). By having several small phase shifts along the grating, adding up to π/2, a gradual phase shift, and hence a uniform intensity distribution can be realised.

An alternative technique is to apply a temperature gradient along the fibre when the grating is being written or to induce a variation of refractive index by means of a uniform UV beam before writing the grating, in order to generate a phase irregularity or discontinuity at around the centre of the grating. Alternatively, a small section in the middle of the grating could be stretched before, during or after the writing of the grating. It is also possible to leave a small section in the middle of the grating unexposed, causing a phase-adjustment region. This can also be done by either erasing the grating or changing the average refractive index at the centre of the grating by focusing a single UV beam at this point. A phase shifted grating could also be made by using a special phase-mask (with phase shift).

Whether a discrete phase discontinuity is achieved through modification of the grating or through the use of a mirror, it is important to note that the phase discontinuity does not tend to act as a resonant cavity (as in a F-P laser). In fact, the length of the phase irregularity or the mirror-grating separation is preferably less than about 1 micrometre ($1\times10^{-6}$ m) (or about half a wavelength in the fibre mediums.

Although the embodiments described above have related to optical fibres, it will of course be appreciated that the techniques are equally applicable to planar waveguides, and in particular, glass planar waveguides.

We claim:

1. An optical fibre distributed feedback laser comprising an amplifying optical fibre doped with erbium and ytterbium and operable to provide optical gain at a lasing wavelength, in which a diffraction grating is disposed on at least a portion of the amplifying optical fibre to provide distributed optical feedback for sustaining lasing action within the portion at the lasing wavelength.

2. A laser according to claim 1, in which the amplifying optical fibre is optically pumped.

3. A laser according to claim 2, in which the amplifying optical fibre is optically end-pumped.

4. A laser according to claim 2, comprising means for generating optical pump radiation to pump the amplifying optical fibre.

5. An optical fibre distributed feedback laser comprising an amplifying optical fibre formed of alumino-phosphosilicate glass doped with erbium and ytterbium and operable to provide optical gain at a lasing wavelength, in which a diffraction grating is disposed on at least a portion of the amplifying optical fibre to provide distributed optical feedback for sustaining lasing action within the portion at the lasing wavelength.

6. An optical fibre distributed feedback laser comprising an amplifying optical fibre doped with erbium and ytterbium and operable to provide optical gain at a lasing wavelength, in which a diffraction grating is disposed on at least a portion of the amplifying optical fibre to provide distributed optical feedback for sustaining lasing action within the portion at the lasing wavelength, and a mirror disposed at one end of the diffraction grating for reflecting at least a part of optical radiation propagating along the diffraction grating.

7. A laser according to claim 6, in which the longitudinal separation between the mirror and the diffraction grating is less than about $10^{-6}$ metres.

8. A laser according to claim 6, comprising means for adjusting the longitudinal separation between the mirror and the diffraction grating.

9. An optical fibre distributed feedback laser comprising an amplifying optical fibre doped with erbium and ytterbium and operable to provide optical gain at a lasing wavelength in which a diffraction grating having at least one phase irregularity is disposed on at least a portion of the amplifying optical fibre to provide distributed optical feedback for sustaining lasing action within the portion at the lasing wavelength.

10. A laser according to claim 9, in which the grating is formed as an interference pattern between two diffraction gratings superposed on the amplifying optical fibre during fabrication of the laser.

11. A laser according to claim 9, comprising means for heating a portion of the grating during operation of the laser, to generate the phase irregularity.

12. A laser according to claim 9, in which the grating comprises a portion having a phase irregularity formed by heating the portion during fabrication of the laser.

13. A method of fabricating an optical fibre distributed feedback laser, the method comprising the step of fabricating a diffraction grating on at least a portion of an amplifying optical fibre doped with erbium and ytterbium and operable to provide optical gain at a lasing wavelength, the diffraction grating providing distributed optical feedback for sustaining lasing action within the portion at the lasing wavelength.

14. An optical waveguide distributed feedback laser comprising an amplifying optical waveguide doped with erbium and ytterbium and operable to provide optical gain at a lasing wavelength, in which a diffraction grating is disposed on at least a portion of the amplifying optical waveguide to provide distributed optical feedback for sustaining lasing action within the portion at the lasing wavelength.

15. An optical waveguide distributed feedback laser comprising a planar amplifying optical waveguide doped with erbium and ytterbium and operable to provide optical gain at a lasing wavelength, in which a diffraction grating is disposed on at least a portion of the amplifying optical waveguide to provide distributed optical feedback for sustaining lasing action within the portion at the lasing wavelength.

16. A laser according to claim 14, in which the waveguide is formed of glass doped with erbium and/or ytterbium.

* * * * *